Nov. 7, 1967    R. HERZOG ETAL    3,351,180
CONVEYOR TROUGH GATE
Original Filed May 7, 1965    2 Sheets-Sheet 1
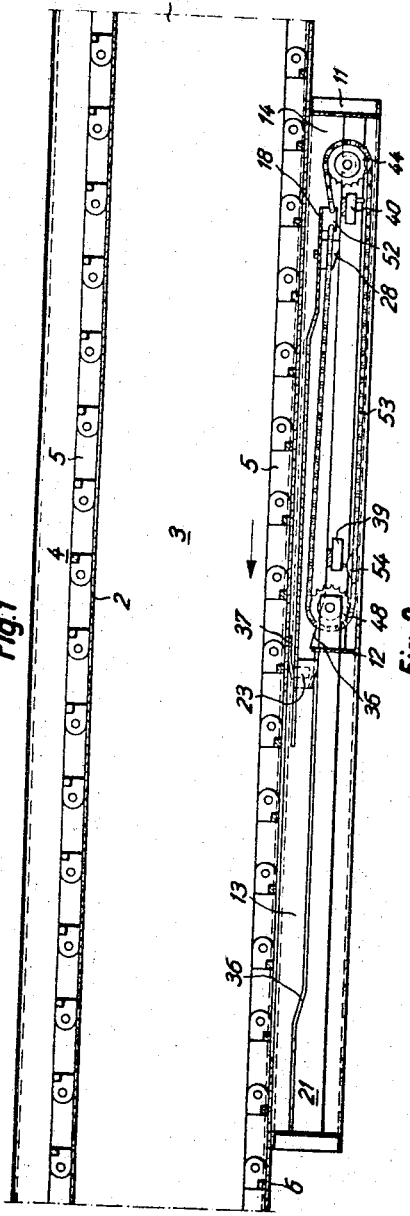
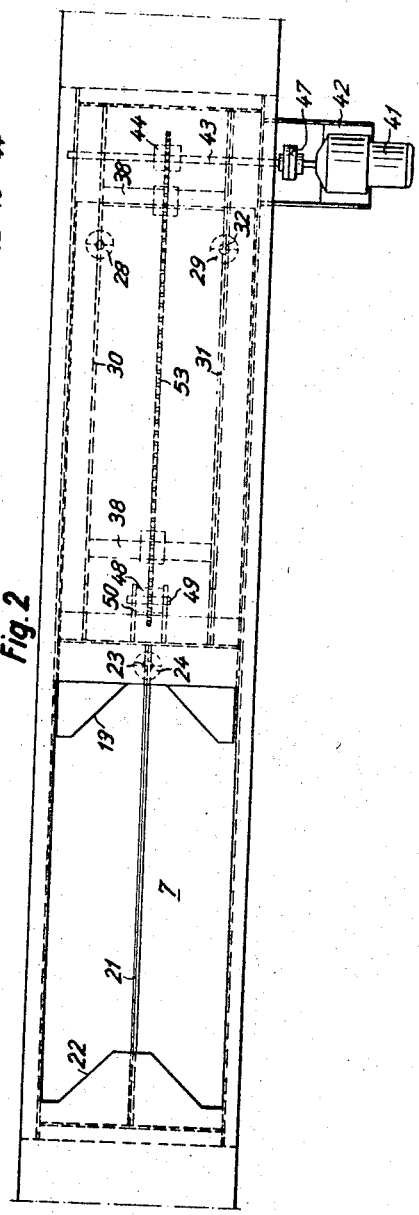
INVENTORS
RENÉ HERZOG
WALTER LANDOLF

INVENTORS
RENÉ HERZOG
WALTER LANDOLF

# United States Patent Office 3,351,180
Patented Nov. 7, 1967

3,351,180
CONVEYOR TROUGH GATE
René Herzog, Niederuzwil, and Walter Landolf, Saint Gall, Switzerland, assignors to Gebruder Buhler, Uzwil, Switzerland
Continuation of application Ser. No. 453,976, May 7, 1965. This application June 28, 1966, Ser. No. 561,296
Claims priority, application Switzerland, May 13, 1964, 6,214/64
16 Claims. (Cl. 198—205)

ABSTRACT OF THE DISCLOSURE

The disclosure relates to a trough-type conveyor for bulk material in which a section of the trough bottom wall is formed with a discharge opening. A chain conveyor has a run extending longitudinally of the bottom wall, and a sliding gate extends along the trough and is arranged to close the port, this gate having a position beneath the bottom wall when the port is open. First and second track means are provided extending longitudinally of the direction of gate movement beneath the trough, the first track means being adjacent the discharge port and the second track means extending away from an end of the port. Guiding means support the gate on the track means for movement between port opening and port closing positions, and driving means are operatively associated with the gate for such movement of the latter. Means are operative between the track means and the gate and lift the gate into coplanar flush relation with the bottom wall as the gate is moved into the port closing position.

*Reference to related application*

This application is a continuation of application Ser. No. 453,976, filed May 7, 1965.

*Background of the invention*

This invention relates to trough-type chain conveyors, for bulk material, having discharge ports or apertures controlled by sliding gates. More particularly, the present invention is directed to a trough-type chain conveyor having a discharge port or opening provided with a sliding discharge control gate which, in the closed position, is flush with the inner surface of the trough.

In the art of trough-type chain conveyors, it is known to provide discharge control gates, for discharge ports or apertures, which discharge control gates are slidably mounted. These gates can be slid, either transversely or longitudinally of the direction of movement of the chain conveyor, between the port opening and port closing positions.

In known arrangements, these slide valves or gates are mounted beneath the trough, and hence their upper surfaces are not at the same level as the upper surface of the bottom of the trough. As a result, relatively large deposits of bulk material are formed due to the higher level of the upper surface of the trough bottom as compared to the upper surface of the slide valve. Additionally, the chain conveyor is not properly supported at the zone of the discharge port. Packings are necessary in order to prevent leakage, and these packings are subjected to dynamic stresses and tend to jam the material being discharged. In turn, this leads to substantial wear on the packings.

An object of the present invention is to provide a trough-type chain conveyor having a discharge port controlled by a sliding valve or gate, and which is free of the disadvantages of prior art conveyors of this type.

Another object of the invention is to provide a trough-type chain conveyor having a discharge port controlled by a slide valve or gate which, in the closed position, has its upper surface substantially flush with the upper surface of the trough bottom.

A further object of the invention is to provide a trough-type chain conveyor having a discharge port controlled by a slide valve or gate, with this slide valve or gate being displaceable relative to the trough beneath the trough bottom until it is nearly in the closing position, at which time the valve or gate is lifted to form a flush closure for the discharge port.

Still another object of the invention is to provide a trough-type chain conveyor including a discharge port controlled by a sliding valve or gate, and characterized by the fact that no dynamically stressed packings are necessary.

Still a further object of the invention is to provide a trough-type chain conveyor having a discharge port controlled by a sliding valve or gate, and in which positive non-jamming operation of the gate is assured.

For an understanding of the principles of the present invention, reference is made to the following description of a typical embodiment thereof as illustrated in the accompanying drawings.

In the drawings:

FIG. 1 is a partial vertical longitudinal section through a trough-type chain conveyor embodying the invention;

FIG. 2 is a partial plan view coresponding to FIG. 1; and

Figure 3:
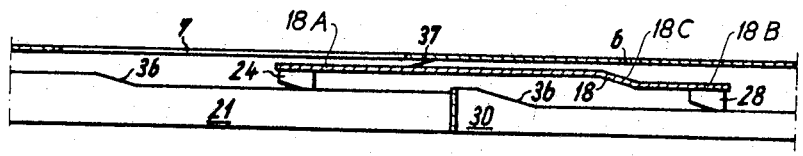
FIGS. 3, 4 and 5 are partial vertical longitudinal sections, partly schematic, illustrating three different positions of the slide valve or gate.

Referring to FIGS. 1 and 2, a trough or tunnel 1 is divided by a partition 2, near its upper edge, into a material conveying compartment 3 and a conveyor return compartment 4. An endless chain conveyor 5 runs through the compartments 3 and 4, the conveyor, in the compartment 3, moving in the direction of the arrow and returning, in the compartment 4, in the direction opposite to that indicated by the arrow. Trough or tunnel 1 has a bottom wall 6 which is formed with a discharge port or aperture 7 having the configuration illustrated more clearly in FIG. 2.

A unit controlling the opening and closing of the discharge port 7 is mounted beneath the bottom walls 6 of the trough or tunnel 1. This unit includes a framework 11 which is divided, by a partition 12, into a discharge part 13 generally coextensive with, but somewhat longer than, the discharge port 7, and a driving part 14.

The actual control of discharge port 7 is provided by a slide valve or gate 18 which has a blunted V-shaped recess 19 in its front end cooperable with the blunted V-shaped projection 22 extending into the discharge port 7. Slide or gate 18 is guided, in the discharge portion 13 of the control unit, by a guiding track 21 extending centrally and longitudinally across the discharge port 7. When gate or slide 18 is closed, its recess 19 conformingly engages the projection 22 to form a complete sealed enclosure for the discharge port 7.

The forward end of gate or slide 18 is provided with a guide shoe 24 engageable in the rail or track 21 and pivoted on a vertical pivot 23 on gate 18. Within the driving part 14 of the control unit, the gate or slide valve 18 is supported on spaced parallel longitudinally extending tracks or rails 30 and 31 by means of sliding shoes 28 and 29. Shoe 28, which is arranged to engage the track 30, is fixed relative to gate 18, whereas shoe 29, engageable with track or rail 31, is pivotal about a vertically extending pivot 32.

As can best be seen in FIG. 1, both the rail or track 21 and the rails or tracks 30 and 31 have obliquely raising steps 36, 36 for a purpose to be described. To prevent accumulation of material on the gate or slide 13, and thus to prevent jamming of the apparatus by material accumulations, a stripper 37 is fixed on the bottom wall 36 of trough or tunnel 1 and is engaged with the upper surface of gate or valve 18.

The control unit includes driving means for moving slide valve or gate 18. This driving means consists of a geared motor 41 mounted on a bracket 42 and connected through a slip clutch 47 to a drive shaft 43. A first sprocket 44, which may be termed a driving sprocket, is secured to rotate with the shaft 43, and a second sprocket 48, which may be termed an idler sprocket, is secured to a shaft 49 which is rotatably mounted in arms 50 projecting to the right from partition 12 as viewed in FIGS. 1 and 2. A chain 53 is trained over the sprockets 44 and 48 and has its opposite ends connected to a suitable projection or bracket 52 extending from the undersurface of gate or slide valve 18 adjacent the rear or right end thereof. Chain 53 is provided with a cam 54 which is cooperable with limit switches 39 and 40, the switch 39 being adjacent the idler sprocket 48 and the switch 40 being adjacent the drive sprocket 44.

Referring to FIGS. 1 through 5, the operation of closing the discharge port 7 is initiated by energizing the motor 41. Through the slip clutch 47, drive shaft 43 and drive sprocket 44, motor 41 drives chain 53 in a direction to move slide valve or gate 18 to the left as viewed in the drawing figures. Just before the gate 18 completely closes the discharge port 7, guide shoe 24 moves upwardly along the obliquely rising steps 36 to the upper horizontal section of track or rail 21. Shortly thereafter and, as a matter of fact, in overlapping relation with this movement, the shoes 28 and 29 move upwardly along the obliquely rising steps 36 of the respective tracks or rails 30 and 31.

Thus, the leading end of slide valve or gate 18 is raised to a level substantially flush with the bottom 6 of trough or tunnel 1 just before the port is completely closed and, as the gate reaches substantially the fully closed position, its trailing end is lifted into flush relation with the bottom 6 of trough or tunnel 1 by virtue of the guide shoes 28 and 29 moving upwardly along the obliquely rising steps 36, 36 of the rails 30 and 31, respectively.

Due to the provision of the centrally extending guide rail and track 21, and the pair of laterally spaced and longitudinally extending guide rails 30 and 31, lateral canting of the slide valve or gate 18 is impossible. Cords or bags which may lie on the track 21 cannot interfere with the closing operation since they are pushed aside by guide shoe 24. Furthermore, the slightly inclined position of the valve or gate 18 just in advance of the complete closure thereof will not interfere with conveyor chain 5, since the latter is moving in the same direction as is the slide valve or gate 18.

The stripper 37, which is of rubber or steel, provides a secure sealing of the driving compartment and acts, during the opening of slide valve or gate 18, to strip off any material adhering on the upper surface of slide valve or gate 18.

The limit switches 39 and 40 may be connected either to provide signals of the fully closed or fully opened position of the slide valve or gate, or may be arranged to open the energizing circuit of geared motor 41, if desired. Due to the provision of the blunted V-shape projection 22 defining the left end of the discharge port 7, conveyor chain 5 runs, without difficulty and without projecting into the discharge port, on the trough bottom 6. Any inaccuracies in the tracks 21 or 31 are compensated by the ability of the guide shoes 24 and 29 to rotate about their pivots 23 and 32, respectively.

It should be noted that, in the opening movement of slide valve or gate 18, the rear or right end thereof is initially lowered as soon as the opening movement is started, so that it will clear beneath the trough bottom 6. Before this lowering movement of the rear end is completed, the forward end of slide valve or gate 18 is also lowered so that the forward end is now supported on the lower horizontal section of the track or rail 21.

In the illustrated arrangement, packings, which have not been represented, are not subjected to dynamic stresses. The primary advantage of the invention arrangement is that, when port 7 is closed by the slide valve or gate 18, the upper surface of slide valve or gate 18 is flush with the upper surface of trough bottom 6, so that no material deposit can be formed even when the slide valve or gate is closed. Thus, the apparatus is protected from damage due to accumulations of material.

Figure 4:
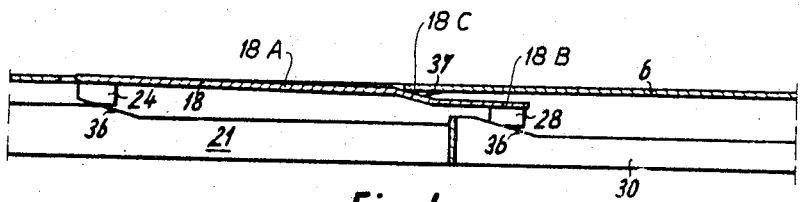
Figure 5:
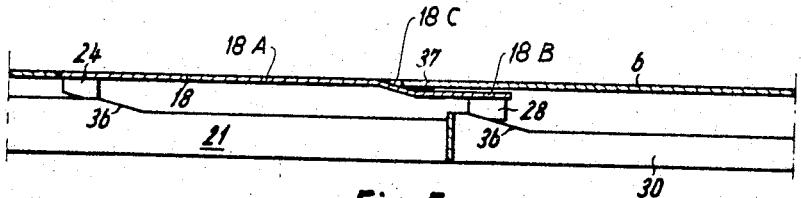

Referring to FIGS. 3, 4 and 5, FIG. 3 shows the slide valve or gate 18 in a position which is intermediate the fully opened position and the fully closed position. In FIG. 4, the slide valve or gate is illustrated just before complete closure and it will be noted that the forward end has been lifted by shoe 24 riding upwardly along the obliquely rising step 36 of track or rail 21, whereas shoes 28 and 29 have just started to rise along the obliquely rising steps 36, 36 of the tracks 30 and 31. FIG. 5 shows a completely closed position in which the somewhat offset right or rear end 18B of slide valve or gate 18 underlaps a portion of the trough bottom 6. This rear section 18B of the slide valve or gate 18 is offset downwardly relative to the forward section 18A by a distance slightly greater than the thickness of trough bottom 6, and the two sections are interconnected by a transition section 18C.

While a specific embodiment of the invention has been shown and described in detail to illustrate the application of the principles of the invention, it will be understood that the invention may be embodied otherwise without departing from such principles.

What is claimed is:

1. A trough-type chain conveyor for bulk material comprising, in combination, a trough having a bottom wall formed with a discharge port therethrough; a chain conveyor having a run extending longitudinally of said bottom wall for moving bulk material to said discharge port; a sliding gate extending along the trough and arranged to close said port, and having a position beneath said bottom wall when said port is open; first track means extending longitudinally of the direction of gate movement adjacent said port beneath said trough; second track means extending longitudinally away from an end of said port beneath said trough; guiding means supporting said gate on said track means for movement between port opening and port closing positions; driving means operatively associated with said gate for such movement of the latter; and means operative between said track means and said gate lifting said gate into coplanar relation with said bottom wall as said gate is moved to the port closing position.

2. A trough-type chain conveyor for bulk material comprising, in combination, a trough having a bottom wall formed with a discharge port therethrough; a chain conveyor having a run extending longitudinally of said bottom wall for moving bulk material to said discharge port; a sliding gate arranged to close said port and having a port opening position beneath said bottom wall; first track means extending longitudinally of the direction of gate movement adjacent said port beneath said trough; second track means extending longitudinally away from an end of said port beneath the trough; and guiding means supporting said gate on said track means for movement between port opening and port closing positions; said track means lifting said gate into coplanar relation with said bottom wall as said gate reaches the port closing position; said track means being formed with ramps lifting said gate into coplanar relation with said bottom wall as said gate reaches the port closing position.

3. A trough-type chain conveyor for bulk material comprising, in combination, a trough having a bottom wall formed with a discharge port therethrough; a chain conveyor having a run extending longitudinally of said bottom wall for moving bulk material to said discharge port; a sliding gate arranged to close said port and having a port opening position beneath said bottom wall; first track means extending longitudinally of the direction of gate movement adjacent said port beneath said trough; second track means extending longitudinally away from an end of said port beneath the trough; and guiding means supporting said gate on said track means for movement between port opening and port closing positions; said track means lifting said gate into coplanar relation with said bottom wall as said gate reaches the port closing position; in the port closing position, the upper surface of said gate being substantially flush with the upper surface of said bottom wall.

4. A trough-type chain conveyor for bulk material, as claimed in claim 3, in which said track means is formed with ramps lifting said gate into coplanar relation with said bottom wall as said gate reaches the closing position.

5. A trough-type-chain conveyor for bulk material comprising, in combination, a trough having a bottom wall formed with a discharge port therethrough; a chain conveyor having a run extending longitudinally of said bottom wall for moving bulk material to said discharge port; a sliding gate arranged to close said port and having a port opening position beneath said bottom wall; first track means extending longitudinally of the direction of gate movement adjacent said port beneath said trough; second track means extending longitudinally away from an end of said port beneath the trough; and guiding means supporting said gate on said track means for movement between port opening and port closing positions; said track means lifting said gate into coplanar relation with said bottom wall as said gate reaches the port closing position; said bottom wall being formed with a projecting portion coplanar with and extending longitudinally and centrally into said port; the leading edge of said gate being formed with a recess conformingly engaging said projection in the closed position of said gate.

6. A trough-type chain conveyor for bulk material, as claimed in claim 5, in which the upper surface of said gate is substantially flush with the upper surface of said bottom wall; said track means being formed with ramps lifting said gate into coplanar relation with said bottom wall as said gate reaches the port closing position.

7. A trough-type chain conveyor for bulk material, as claimed in claim 3, in which said first and second track means are formed with first and second upwardly sloping ramps, respectively, for lifting said gate into coplanar relation with said bottom wall as said gate reaches the port closing position; said guiding means engaging said first ramp in advance of engaging said second ramp, whereby the leading edge of said gate is lifted upwardly before the trailing edge of said gate is lifted upwardly.

8. A trough-type chain conveyor for bulk material comprising, in combination, a trough having a bottom wall formed with a discharge port therethrough; a chain conveyor having a run extending longitudinally of said bottom wall for moving bulk material to said discharge port; a sliding gate arranged to close said port and having a port opening position beneath said bottom wall; first track means extending longitudinally of the direction of gate movement adjacent said port beneath said trough; second track means extending longitudinally away from an end of said port beneath the trough; and guiding means supporting said gate on said track means for movement between port opening and port closing positions; said track means lifting said gate into coplanar relation with said bottom wall as said gate reaches the port closing position; said first track means comprising a first track extending longitudinally and centrally across said port beneath said trough; said second track means comprising a pair of laterally spaced second tracks extending longitudinally away from an end of said port beneath said trough; said guiding means including first guiding means supporting said gate on said first track and second guiding means supporting said gate on said second track; said gate, in the closing position, having its upper surface substantially flush with the upper surface of said bottom wall.

9. A trough-type chain conveyor for bulk material, as claimed in claim 8, in which said first track has a first upwardly sloping ramp thereon and each of said second tracks has a second upwardly sloping ramp thereon; said ramps lifting said gate into said substantially flush relation with said bottom wall as said gate reaches the port closing position.

10. A trough-type chain conveyor for bulk material, as claimed in claim 9, in which said guiding means includes a first guide shoe engageable with said first track and a pair of second guide shoes engageable with said second tracks; said ramps, in cooperation with said guide shoes, lifting said gate into such flush relation with said bottom wall as said gate reaches the port closing position.

11. A trough-type chain conveyor for bulk material, as claimed in claim 10, in which said first guide shoe engages said first ramp before said second guide shoes engage said second ramps, whereby the leading edge of said gate is lifted before the trailing edge of said gate is lifted.

12. A trough-type chain conveyor for bulk material, as claimed in claim 8, in which said bottom wall includes a substantially coplanar projection extending centrally and longitudinally into said discharge opening; the leading edge of said gate being formed with a recess conformingly engaging said projection in the closed position of said gate.

13. A trough-type chain conveyor for bulk material, as claimed in claim 10, in which the trailing edge of said gate is offset downwardly relative to the major portion of said gate to extend beneath said bottom wall when said gate substantially fills said discharge opening in the closing position.

14. A trough-type chain conveyor for bulk material, as claimed in claim 8, including driving means connected to said gate to move the same between the port opening and the port closing positions; an electric motor; and a slip clutch connecting said electric motor to said driving means.

15. A trough-type chain conveyor for bulk material, as claimed in claim 14, including limit switch means operated by said driving means at each limiting position of said gate, and operable to indicate the position of said gate.

16. A trough-type chain conveyor for bulk material, as claimed in claim 14, including a pair of limit switches operated by said driving means, one at each limit of movement of said gate; said limit switches controlling energization of said electric motor.

References Cited

UNITED STATES PATENTS

| | | | |
|---|---|---|---|
| 941,442 | 11/1909 | Dornfeld | 251—203 |
| 2,487,693 | 11/1949 | Cannon | 198—205 |
| 3,182,954 | 5/1965 | Borger | 251—203 |

EVON C. BLUNK, *Primary Examiner.*

RICHARD E. AEGERTER, *Examiner.*